(12) United States Patent
Amit et al.

(10) Patent No.: US 7,274,679 B2
(45) Date of Patent: Sep. 25, 2007

(54) SCALABLE VIRTUAL CHANNEL

(76) Inventors: Mati Amit, 23 Nof Harim St., Zur-Yigal (IL); Ofir Shalvi, 19 Tabenkin St., Herzlia 46000 (IL); Ariel Yagil, 13 Mordechay St., Ramat-Hasharon 47441 (IL)

( * ) Notice: Subject to any disclaimer, the term of this patent is extended or adjusted under 35 U.S.C. 154(b) by 896 days.

(21) Appl. No.: 09/761,545

(22) Filed: Jan. 16, 2001

(65) Prior Publication Data

US 2002/0131426 A1    Sep. 19, 2002

Related U.S. Application Data

(60) Provisional application No. 60/213,351, filed on Jun. 22, 2000.

(51) Int. Cl.
*H04J 1/00* (2006.01)
(52) U.S. Cl. ........................ 370/343; 370/395.4
(58) Field of Classification Search ............ 370/352, 370/469, 488, 203, 204, 210, 466, 485–486, 370/370; 725/111, 95–96; 375/222
See application file for complete search history.

(56) References Cited

U.S. PATENT DOCUMENTS

| | | | | |
|---|---|---|---|---|
| 5,577,035 | A * | 11/1996 | Hayter et al. | 370/395.4 |
| 6,047,528 | A * | 4/2000 | Scholin et al. | 53/455 |
| 6,289,006 | B1 * | 9/2001 | Schobl | 370/330 |
| 6,336,201 | B1 * | 1/2002 | Geile et al. | 714/755 |
| 6,351,473 | B1 * | 2/2002 | Reusens et al. | 370/480 |
| 6,625,174 | B1 * | 9/2003 | Hethuin et al. | 370/481 |
| 6,633,559 | B1 * | 10/2003 | Raith et al. | 370/350 |

* cited by examiner

*Primary Examiner*—Edan Orgad
*Assistant Examiner*—Lawrence J Burrowes
(74) *Attorney, Agent, or Firm*—Steven A. Shaw; W. James Brady; Frederick J. Telecky, Jr.

(57) ABSTRACT

The present invention comprises aggregating a plurality of physical channels to a single logical channel, a scalable virtual channel (SVC). This may be implemented in a point to multipoint communications system. The present invention enables a variety of receivers, some receivers being able to receive only one physical channel, and other receivers being able to receive a plurality of physical channels as a SVC, with at least one same channel being used for both types of receivers.

13 Claims, 4 Drawing Sheets

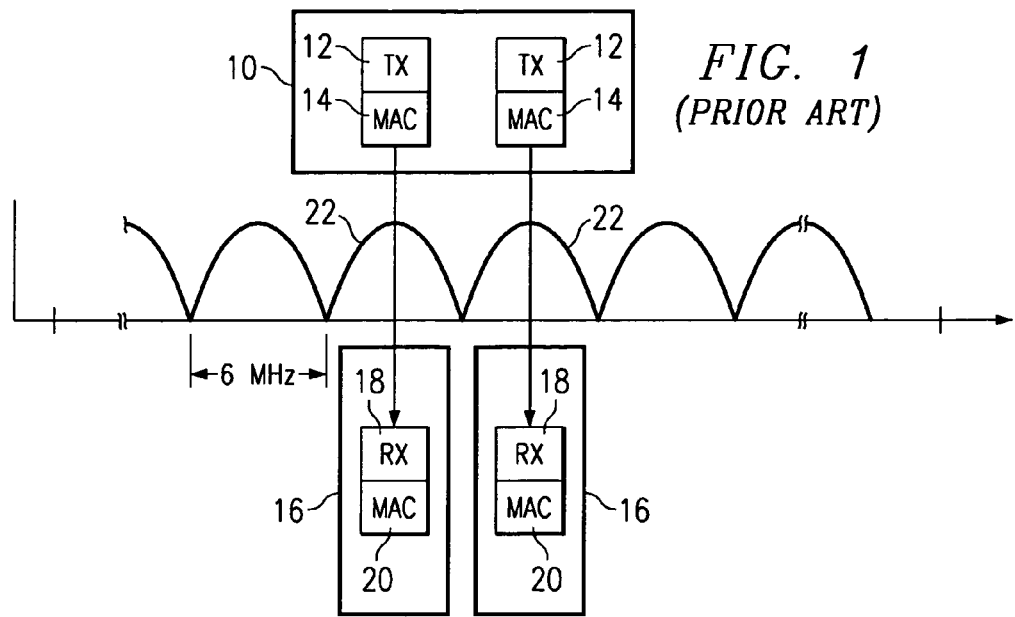
FIG. 1 (PRIOR ART)
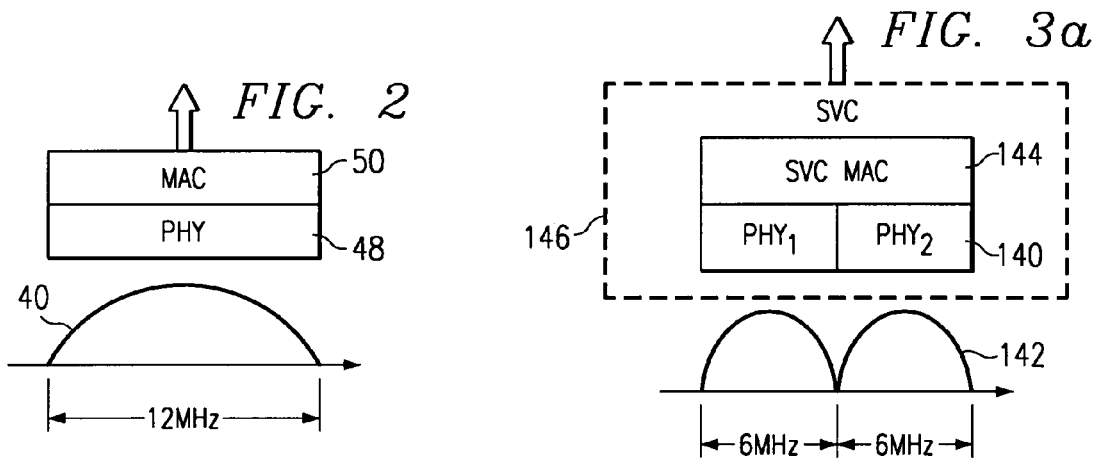
FIG. 2
FIG. 3a
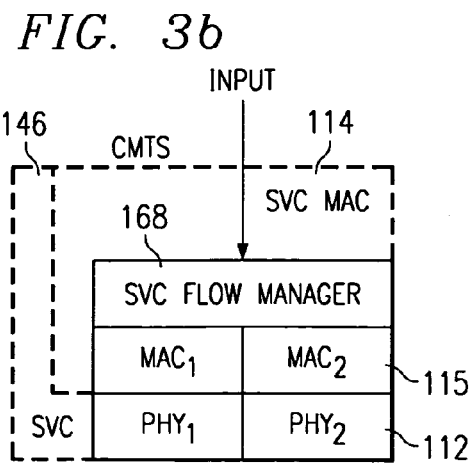
FIG. 3b
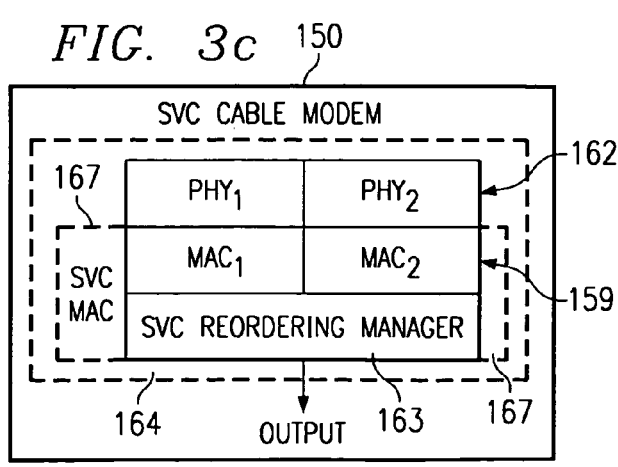
FIG. 3c

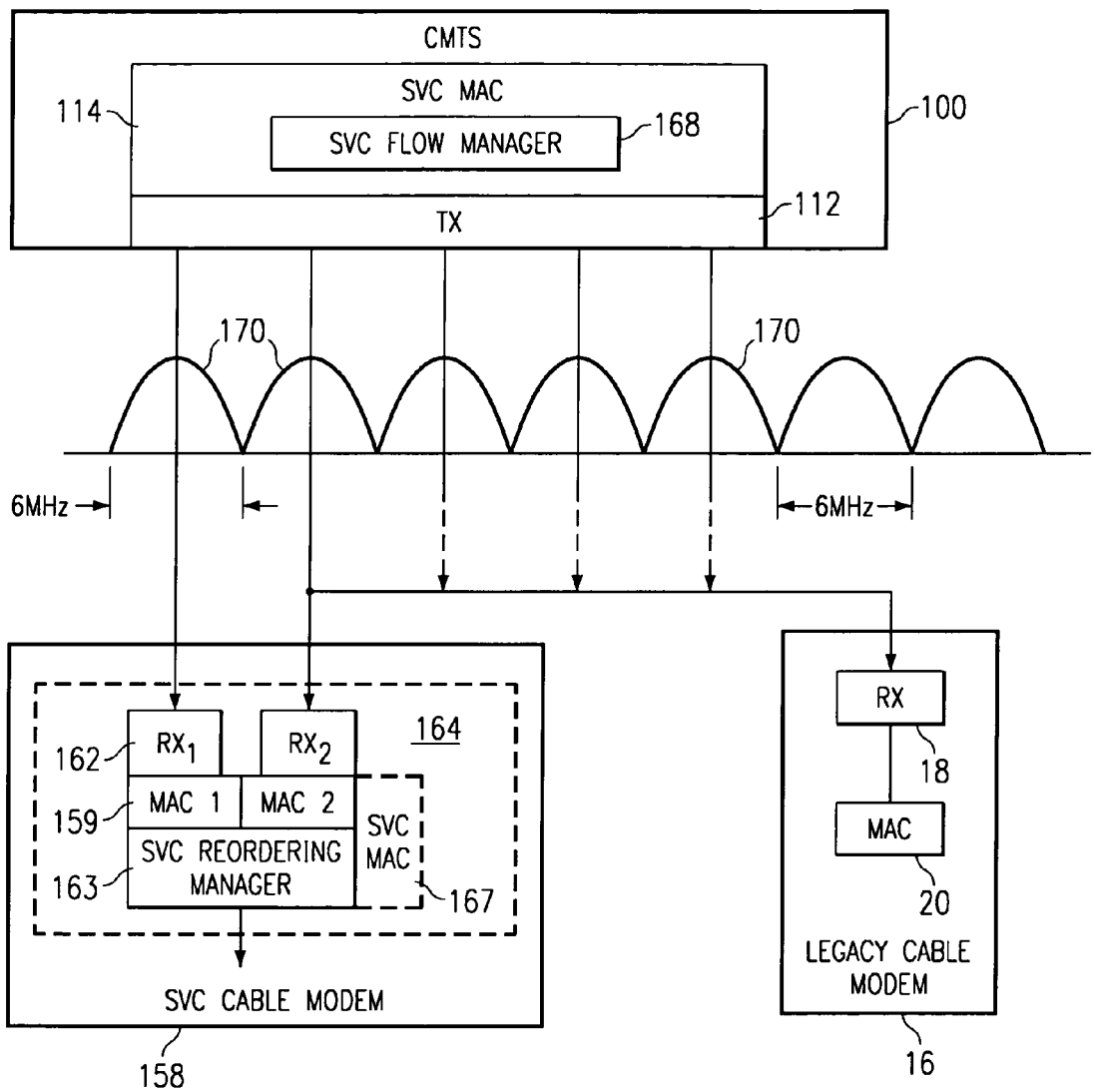
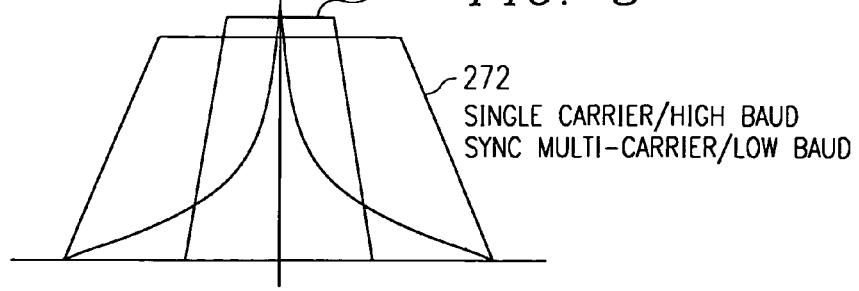

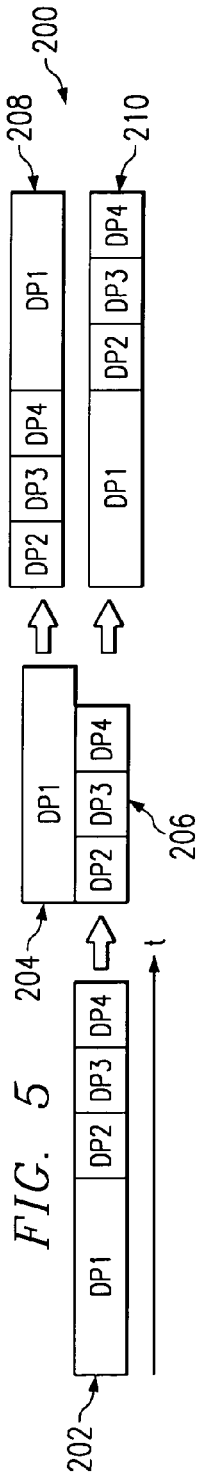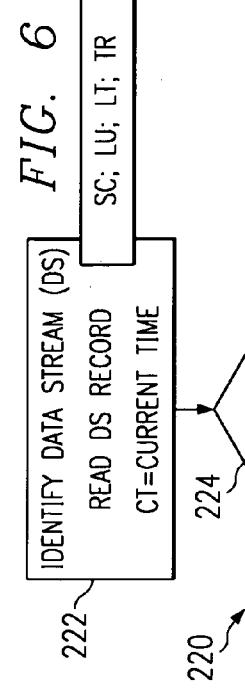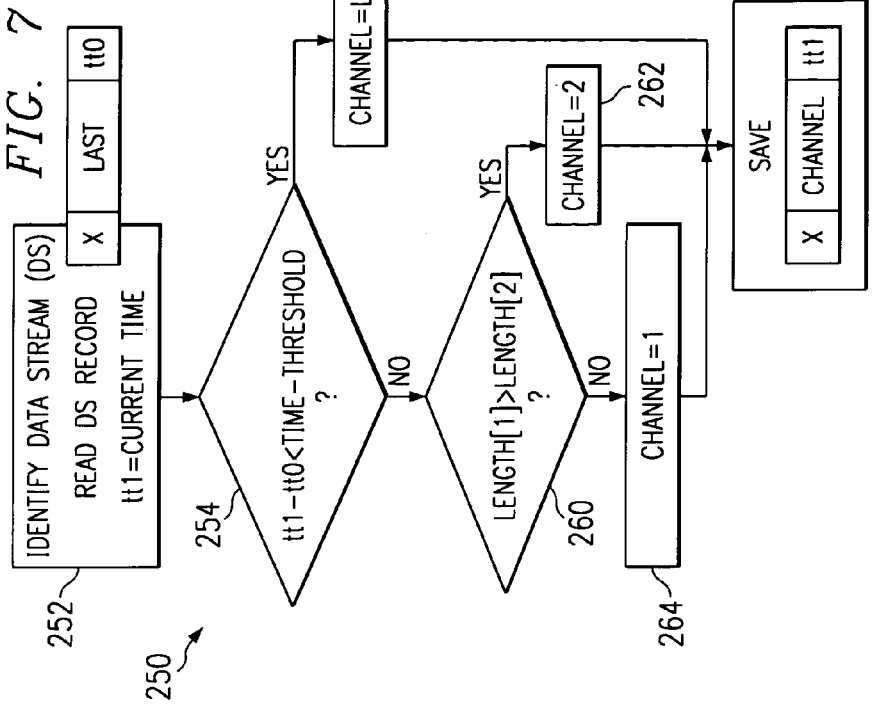

SCALABLE VIRTUAL CHANNEL

This application claims priority under 35 U.S.C. § 119(e) of Provisional Application No. 60/213,351, filed Jun. 22, 2000.

TECHNICAL FIELD

This invention relates generally to communications networks, and more particularly to a scalable virtual channel for communication networks.

BACKGROUND OF THE INVENTION

Cable modems that are being deployed today allow high-speed Internet access in the home over a cable network, often referred to as a hybrid fiber coax (HFC) network. Cable modems (CM) are units, often referred to as customer premises equipment (CPE), that are connected to a personal computer (PC) or other computing device, for example. A cable modem is adapted to communicate with a cable modem termination system (CMTS) that may include a cable network provider's headend. A cable modem is a modulator/demodulator that receives Internet traffic or information, data, TV signals, and telephony from a server through the CMTS and puts it into a format recognizable by a user's PC, allowing a user to browse the Internet, and send/receive e-mail just as they would with a conventional modem on a PC. Using a cable modem over a cable network provides a much faster connection, being at least 10 times faster than a 56K modem, for example.

A cable modem performs modulation and demodulation and the operations necessary to interface with a PC or a local area network (LAN). A cable modem typically comprises a transmitter for upstream modulation of a data signal, usually in short bursts. The upstream direction refers to sending a data signal from the user at the cable modem towards the headend that serves as an upstream demodulator. The upstream signal may comprise a TV channel, program selection or Internet data request information, for example, and may be a Quadrature Phase Shift Keying (QPSK)/16-Quadrature Amplitude Modulation (QAM) signal at 3 Mbit/s, for example. The cable modem also comprises a receiver for downstream demodulation of signals received from a transmitter in the headend that serves as a downstream modulator. The downstream direction refers to sending a data signal from the headend to the cable modem. The downstream modulation/demodulation may be 64-QAM/256 QAM at 27-56 Mbit/s, for example. Both the cable modem and headend include MACs that control the media access control (MAC) sublayer of the communication network. The communications between a cable modem and a CMTS typically are in accordance with an Internet protocol (IP)/Ethernet standard and the Data Over Cable Service Interface Specification (DOCSIS) standard.

In the U.S., signals are transmitted over a 100-860 Mhz range in increments of 6 Mhz to each cable modem user, with the CMTS servicing a hundred or so cable modem users, illustrated in the prior art drawing of FIG. 1. Each carrier 22 occupies 6 Mhz (8 Mhz in Europe). The CMTS 10 comprises a plurality of transmitters 12, each having a MAC 14 associated therewith. Each transmitter 12 is adapted to transmit data over the cable network at a particular frequency having a bandwidth of 6 MHz to cable modems 16 (typically many more than one) that have been assigned that frequency. Cable modem 16 comprises a receiver 18 and has a MAC 20 associated therewith for receiving the data.

A problem with the network architecture shown in FIG. 1 is that the CMs serviced by the network have to be distributed between multiple 6 MHz carriers in order to provide the required throughput to each CM. This separation imposes constraints on the network management and causes inefficient utilization of the bandwidth.

What is needed in the art is a more efficient way of utilizing the bandwidth, enabling the servicing of more cable modems 16 and/or enabling more throughput for each cable modem.

SUMMARY OF THE INVENTION

The preferred embodiment of the present invention achieves technical advantages as a communication network that utilizes a scalable virtual channel (SVC) to more efficiently utilize bandwidth. Two or more physical channels are used as a single virtual (logical) channel. An SVC CMTS includes at least two physical layer (PHY) transmitters, and a SVC MAC function coupled to the transmitters. An SVC cable modem having an SVC includes a MAC function and at least two PHY receivers coupled to the MAC function.

Disclosed is a data receiving device, comprising a SVC MAC function, a first PHY receiver coupled to the SVC MAC function, and at least a second PHY receiver coupled to the SVC MAC function, wherein the SVC MAC function is adapted to converge the receipt of data transmission for the first and second receivers.

Further disclosed is a data transmission device, comprising a plurality of transmitters, a SVC MAC function coupled to the transmitters, wherein the transmission device is adapted to send data to a cable modem over at least two physical channels adapted to be a single virtual channel.

Also disclosed is a communication network, comprising a data transmission device including a plurality of transmitters, a transmitting SVC MAC function coupled to the transmitters, and a data receiving device including a receiving SVC MAC function, and a plurality of receivers coupled to the receiving SVC MAC function, wherein the transmission device is adapted to send data to the data receiving device over a plurality of physical channels adapted to be a single virtual channel.

Also disclosed is a method of transmitting data, comprising receiving a data stream comprising packets to send to a receiving device, sending a first portion of the data stream packets to the receiving device over a first carrier, and sending a second portion of the data stream packets to the receiving device over a second carrier, wherein the first carrier and the second carrier operate as a single virtual channel for the data stream.

Advantages of the invention include providing a solution having a wideband downstream logical channel (80-860 Mbps and more) that is backward compatible with legacy cable modems, scalable, and based on current PHY layer. A single MAC is required for controlling at least two PHY receivers of the SVC cable modem. The architecture is scalable, and carriers of the same virtual channel may have different PHY parameters. The architecture is backward compatible, and each pair of signals may have synchronized carrier frequencies and symbol clocks to allow improved phase noise performance. Optimized service may be achieved for any balance between legacy cable modems and SVC cable modems. Incremental and smooth deployment of SVC cable modems may be implemented. In addition, the system may operate at a very simple low power mode, and may provide a very high quality of service (QoS). Additionally, the present invention is DSP-friendly and parallel processing-friendly.

Another advantage of the present invention is the fact that a system can be built where the plurality of channels are synchronized. This may be used by the receiver to improve the algorithm by reducing the phase noise, for example.

BRIEF DESCRIPTION OF THE DRAWINGS

The above features of the present invention will be more clearly understood from consideration of the following descriptions in connection with accompanying drawings in which:

FIG. 1 illustrates a prior art cable modem and CMTS communicating over a single channel;

FIG. 2 shows a cable modem/CMTS communication structure with a wider bandwidth being used to transfer data;

FIGS. 3a-3c show conceptual diagrams of the SVC MAC, PHY and SVC functionality;

FIG. 4 shows an embodiment of the present invention where a legacy cable modem is serviceable by the same CMTS as the cable modem having a scalable virtual channel;

FIG. 5 shows a solvable potential packet flow problem with the present invention;

FIG. 6 shows a packet ordering algorithm in accordance with an embodiment of the present invention;

FIG. 7 shows another packet ordering algorithm in accordance with an embodiment of the present invention;

FIG. 8 illustrates a solvable potential phase noise problem;

Corresponding numerals and symbols in the different figures refer to corresponding parts unless otherwise indicated.

DETAILED DESCRIPTION OF PREFERRED EMBODIMENTS

Figure 9:
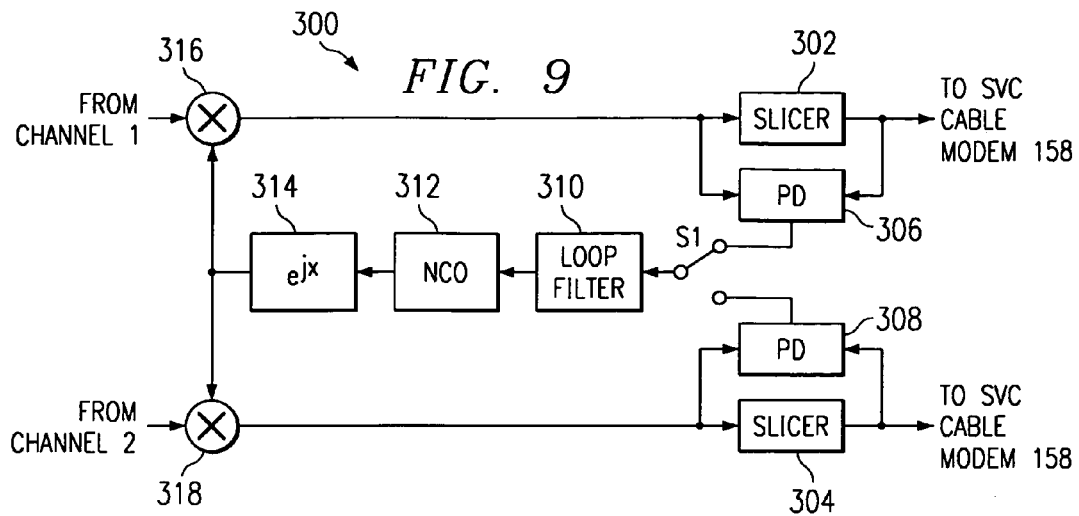
FIG. 9 shows a circuit to solve the phase noise problem.
Figure 10:
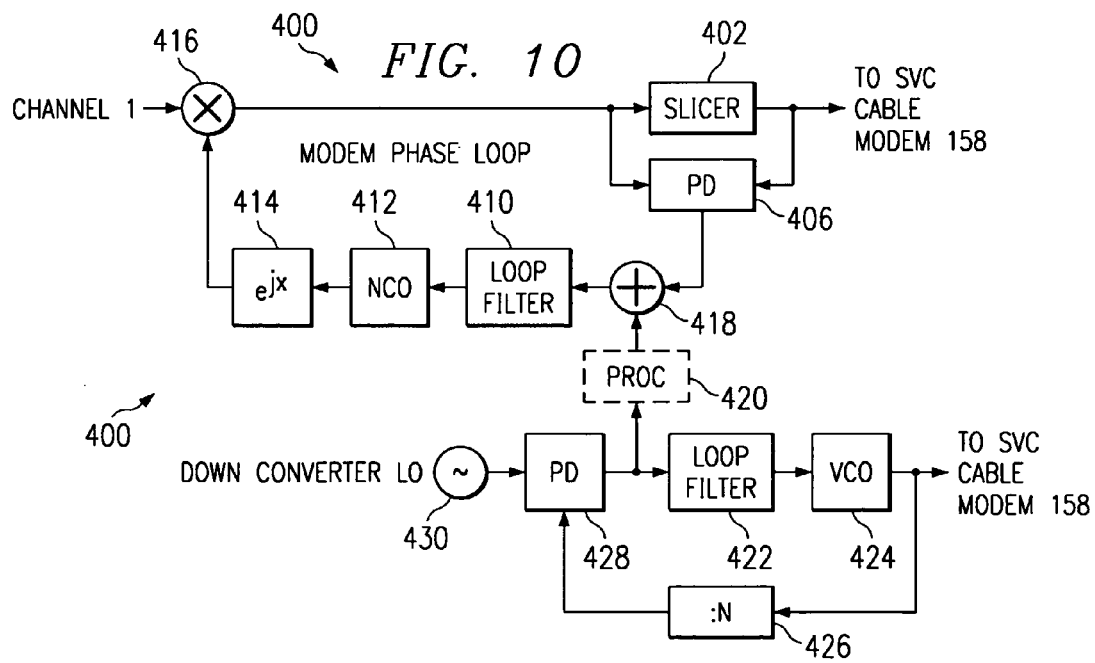
FIG. 10 shows an alternate circuit for solving the phase noise problem.

Prior art problems will be discussed, followed by a description of several embodiments and advantages of the present multi-carrier scalable virtual channel invention.

The term "MAC function" is defined herein as comprising circuitry and algorithm(s)adapted to perform MAC layer functions, which include bandwidth management, packet encryption, handling payload header suppression, placing Ethernet packets inside an MPEG cell, data encryption, data concatenation, defragmentation, and deconcatenation, as examples.

The terms "SVC reordering manager" and "SVC flow manager" are defined herein as comprising circuitry, software, algorithm, and storage media coupled to the CM MAC and CMTS MAC, respectively, that handle issues that are specific to the SVC, e.g. which channel to use. The SVC reordering manager and SVC flow manager may comprise, as examples, a processor or processors, state machine, other circuitry, combination logic, and/or storage media. The SVC flow manager may also be embedded within the CMTS MAC hardware and/or software. A MAC function and SVC flow manager may comprise software operating on the same processor, for example.

The term "channel" is defined herein as comprising a path from one device to one or more other devices (i.e., point-to-point or point-to-multi-point channels).

The term "carrier" is defined herein as a data-carrying signal comprised of a single modulated tone. A carrier is a subset of a channel, with one or more carriers per channel being used in accordance with the present SVC invention.

A problem with the prior art communication architecture shown in FIG. 1 is that the downstream throughput is 5 Mbaud at 30/40 Mbps in the U.S., and in Europe, 7 Mbaud at 42-56 Mbps. There are a variety of advantages in increasing the channel bandwidth, such as, future applications require much more throughput than this (e.g., 80 Mbps and higher). A wider channel is more efficient for broadcast and multicast, and enables better statistical multiplexing. Factors driving this increased throughput requirement include more efficient utilization data channels (Statistical Multiplexing), higher peak throughput per single user, video transportation using Moving Picture Experts Group (MPEG) over IP (and other multi/broadcast), and Integrated Cable Network Architecture (ICNA): convergence of data, voice and video streams on a single pipe.

In many multi-user communications networks, it is desirable to expand the bandwidth when the demand for throughput increases. Therefore, it is desirable that the network would be scalable, that is, increasing the channel bandwidth would require minimal incremental cost and effort and result in maximal overall improvement. A scalable network would take advantage of all the benefits of a wideband channel such as higher throughput and better statistical load balance. When more bandwidth becomes available to the multi-user networks mentioned above there are a few possible solutions, one being an increased Baud approach and another being a network segmentation approach.

In an increased baud approach, the baud rate of the network is increased without changing the characteristics of the transmission. The network layers, more specifically the PHY layer and the MAC sub-layer, are replaced with similar layers that operate at higher rate and may have other improved features such as higher spectral efficiency. For example, a single-carrier signal would remain a single-carrier signal, but with a higher Baud rate, with only one logical channel.

Increasing the Baud rate allows optimal utilization of the expanded bandwidth. The optimization is in the following respects. First, there is no need for duplicate transmissions of broadcast and multicast packets. Second, all the channel bandwidth is visible to all the users. Therefore, the channel can support the cases of statistical load distribution in which the overall rate is not greater than the channel throughput. Third, the peak data rate that is provided to the users is maximized, and fourth, there is minimal average latency and good phase noise performance. Additionally, a single carrier with a high symbol rate is more robust to a given phase noise level than a single carrier with lower symbol rate.

However, there are disadvantages to increasing the Baud rate. Legacy stations, e.g. existing cable modems, that typically cannot support the higher symbol rate must use a different frequency band, thus increasing the spectral occupancy of the network. Alternatively, existing cable modems must be replaced. Therefore, increasing the Baud rate induces a very high cost and can be impractical in many cases.

A network segmentation approach involves increasing the number of carriers, with each carrier being a physical and logical channel. Each channel is managed independently, in a similar manner to a channel or channels that existed before the expansion. The users are divided among the old and new channels. Each user is served by a single narrowband channel. At least some of the channels have PHY layer and MAC sub-layer that are identical to and compatible with the legacy stations.

The network segmentation approach which increases the number of independent carriers allows for backward compatibility because the channels that are used prior to the expansion are not used. However, this approach lacks the benefits that increasing the Baud rate has, described above.

FIG. 2 shows a cable modem/CMTS communication structure that demonstrates the increased Baud approach. A single-carrier with a double Baud rate (12 MHz or more) has been suggested. Rather than sending data destined for a cable modem 16 over a 6 MHz band 22 (as in FIG. 1), data is sent over a 12 MHz band (FIG. 2) for a particular PHY 48 and MAC 50. Some advantages of this single-carrier configuration include requiring no change in the PHY 48 and MAC 50, except for a 2-fold (or N-fold) Baud rate. No new specifications are requiredexcept of the Baud rate change. A better phase-noise performance is achieved than low-Baud single carrier, thus allowing higher constellations with existing tuners. Also, the network is more robust to ingress and channel distortion.

However, there are several disadvantages to the proposed configuration shown in FIG. 2. First, it is not backward compatible and not scalable. Longer equalizers are required, and there is less burst robustness. There is a high power requirement, and the solution is less applicable for digital signal processors (DSPs).

FIG. 3a shows a high-level illustration of a preferred embodiment of the present invention. The SVC MAC 144 is coupled to a plurality of PHY components 140, and each one of them either transmits or receives data over a single channel 142. A dual (or more) carrier 142 transmission or reception by two PHY layers 140 is converged by a single SVC MAC 144. Each carrier 142 occupies 6 Mhz (8 Mhz in Europe), as in the prior art configuration shown in FIG. 1. The SVC 146 handles the virtual channel functionality.

The embodiment of FIG. 3a is backward compatible because the PHY characteristics of each carrier are not changed. Therefore, a legacy modem with a single carrier is capable of receiving information from one of the carriers. It is the responsibility of the SVC transmitter MAC to forward all the information sent to this receiver through the carrier that the receiver is tuned to. (The same argument holds for the case when an SVC with N>2 carriers is used, and the legacy receiver is capable of receiving M<=carriers). The transmitter's MAC 144 is responsible for distributing the downstream packets into the channels. The receiver's MAC 144 is responsible for collecting the packets in the right order. Carriers of the same virtual channel SVC 146 may have different PHY parameters (constellation, interleaver parameters, etc.). Each pair of signals may have synchronized carrier frequencies and symbol clocks to allow improved phase noise performance. The SVC invention enables high throughput in the CATV downstream channel, in order to enable better channel utilization.

FIG. 3b shows a CMTS SVC subsystem 146. The CMTS SVC MAC 114 is comprised of SVC flow manager 168 and a plurality of MACs 115. SVC subsystem 146 comprises a single SVC flow manager 168 that has a single packet input and is responsible to transmit each packet through the appropriate channel (broadcast and multicast packets may be duplicated). The SVC subsystem 146 also comprises a plurality of MAC 115 layers (MAC1, MAC2) that are similar to legacy MACs. Each one of the MACs 115 is coupled to a single PHY 112 (PHY1, PHY2) that may be similar to the prior art PHY.

FIG. 3c illustrates a SVC cable modem 150 including a cable modem SVC subsystem 164. The CM SVC MAC 167 is comprised of SVC reordering manager 163 and a plurality of MACs 159. SVC subsystem 164 comprises a single SVC reordering manager 163 that has a single packet output and is responsible for receiving the packets from a plurality of channels (broadcast and multicast packets may be eliminated), and for sending them in the appropriate order through the single output. The SVC subsystem 164 also comprises a plurality of MAC 159 layers (MAC1, MAC2) that are similar to legacy CM MACs. Each one of the MACs 159 is coupled to a single PHY 162 (PHY1, PHY2) that may be similar to the prior art PHY.

FIG. 4 shows an embodiment of the present invention where a legacy cable modem 16 is serviceable by the same CMTS 100 as the present scalable virtual channel (SVC) cable modem 158 having a SVC subsystem 164. The CMTS 100 comprises a PHY layer which includes a plurality of transmitters 112. The transmitters 112 are coupled to SVC MAC 114. The transmitters 112 may be adapted for higher constellations such as 1024 QAM, and are adapted to synchronize the symbol rate of the channels 170, for example. The CMTS transmitter SVC MAC 114 is preferably adapted to operate at 100 Mbps or more and is responsible for distributing the downstream packets into the channels 170. The cable modem reordering manager 163 is responsible for reordering the packets in the right order.

The CMTS SVC MAC 114 includes an SVC flow manager 168 and management software. The CMTS management software specifies for each SVC CM 158 and legacy CM 16 the channels 170 upon which it is required to receive data. The CMTS management software also configures the SVC flow manager 168 with this channel information. The SVC flow manager 168 receives data packets and transmits the data packets in the appropriate channel. The SVC flow manager 168 management software may be implemented in hardware but preferably is implemented in software. The CMTS 100 is adapted to send data to SVC cable modem 158 over a plurality of physical channels 170 adapted to be a single virtual channel.

The CMTS 100 is adapted to transmit data by receiving data to send to a receiving device such as a SVC cable modem 158, sending the data over either the first carrier or the second carrier to the receiving device, wherein the first carrier and the second carrier operate as a single virtual channel 164 for the data.

SVC cable modem 158 includes a plurality of PHY receivers Rx1/Rx2 (shown generally as 162) coupled to the MAC 159. The SVC cable modem 158 includes a SVC channel Rv (164) as shown. The SVC cable modem MAC 167 preferably includes a SVC reordering manager 163. Preferably, the receivers 162 are adapted to operate at 1024 QAM and include a joint phase loop. Preferably, SVC MAC 167 is adapted to operate at 100 Mbps or more. The SVC MAC function 167 is adapted to converge the receipt of data transmission for the first and second PHY receivers Rx1/Rx2.

The SVC cable modem 158 is adapted to receive data by receiving data from a first carrier 170, receiving data from a second carrier 170, and merging the data from the first carrier with the data from the second carrier, wherein the first carrier and the second carrier operate as a single virtual channel for the data.

There are several advantages to the multi-carrier SVC architecture shown in FIGS. 3a-3c and 4. A single SVC MAC 167 is required for the SVC cable modem 158. The architecture is scalable, meaning that two or more, (e.g. four, six or more) 6 MHz channels 170 (or 8 MHz for Europe) may be utilized with the SVC 164. Several reordering methods with different performance/complexity tradeoffs are considered and will be described further herein.

In addition, carriers of the same virtual channel may have different PHY parameters (constellation, interleaver parameters, etc.). The architecture is backward compatible, meaning that one or more of the cable modem receivers may be legacy single-carrier cable modems 16 being identical to the current DOCSIS specification, as shown in FIG. 4. Each pair of signals may have synchronized carrier frequencies and symbol clocks to allow improved phase noise performance, beneficial when 1024 QAM is used, for example. The architecture may be supported by existing PHY.

Furthermore, the present invention allows nearly optimal service for any balance between legacy cable modems 16 and SVC cable modems 158. The incremental and smooth deployment of advanced SVC cable modems 158 may be implemented. Optimal service may be achieved when the various cable modems 16/158 have different channel conditions. The system may operate at a very simple low power mode, and may provide a very high quality of service (QoS). Additionally, the present invention is DSP-friendly and parallel processing-friendly e.g. for the PHY 162 and SVC MAC 167.

Another advantage of the present invention is the fact that a system can be built where the plurality of channels are synchronized. This may be used by the receiver to improve the algorithm by reducing the phase noise, for example, to be described further herein.

The CMTS MAC 114 preferably includes a SVC flow manager 168 for efficient distribution of the packets to the carriers. Because messages may not necessarily arrive at the SVC cable modem 158 in the transmitted order, a SVC reordering manager 163 may be required in the cable modem MAC 160. FIG. 5 shows in general at 200 a potential packet flow issue with the present invention that may be alleviated with a SVC reordering manager 163 in the SVC cable modem 158 MAC 160, for example. Data packets DP1 through DP4 (shown at 202) are sent by the CMTS 100 with instructions from the MAC 168 to schedule the data packets in a particular PHY, for example, for DP1 to arrive in receiver Rx1 (shown at 204) and DP2 through DP4 to arrive in receiver Rx2 (shown at 206). The SVC cable modem MAC SVC reordering manager 163 is adapted to reorder the packets in the order shown at 210 rather than in the order shown at 208, a possible ordering sequence if a SVC reordering manager 163 is not utilized.

The latency (i.e. the time between the arrival of a packet to the transmitting station until the end of reception by the receiving station) of the carriers is not necessarily identical due to different queue lengths and PHY parameters (spectral efficiency, interleaver lengths, etc.). Therefore, the order of the packets in the receiving station may be different than the original order. It is desirable to recover the original order of the packets.

Several ordering and reordering methods may be implemented with the SVC feature. Unicast, shortest queue, enumerated, threshold, broadcast, and multicast scheduling and reordering schemes are present herein although other scheduling and reordering schemes may be utilized.

A possible solution for the reordering problem in a multi-carrier MAC unicast scheduling scheme is to order data packets according to start of transmission time. The CMTS 100 may send each packet to the carrier 170 with the shortest queue, for example, in time units, rather than data units. The cable modem 158 determines the correct packet order according to the time of arrival. Additional buffering may be required at the cable modem 158 with the unicast scheme. To optimize QoS, (e.g. to prevent packet DP2 from being deferred until packet DP1 is completely received, although packet DP2 may be from a different service flow and require high QoS) more complex scheduling may be implemented, such as setting a different queue for each MAC address.

Unicast packets, which refer to transmitting packets to one addressee, are transmitted over one or more of the common carriers that are used by both stations. When there is more than one such carrier, the choice of the carrier (or carriers) is made by the transmitting station MAC 114.

The method chosen can be one the following methods, a combination of them or others, for example. One alternative is to transmit the whole packet over one carrier. The carrier is chosen according to a pre-determined criterion such as shortest queue, where "shortest queue" may be in the sense of shortest time, shortest data queue, shortest latency or other sense, for example.

Another alternative is to distribute the packet data over more than one of the common carriers of the transmitting and receiving stations. This method can guarantee minimal latency and practically identical behavior as increasing the Baud rate option with the data rate being the combined data rates of the carriers.

A further alternative is to choose a carrier or carriers according to QoS or other criteria determined by a classifier. Other criteria may comprise, for example, the packet MAC address, the packet length, or others. For example, one carrier can be reserved for latency-sensitive packets, e.g. voice packets. When a classifier is used, QoS performance of the proposed method can be better than the increased Baud approach, i.e. latency of high QoS packets can be shorter than in the increased Baud approach.

FIG. 6 describes a portion of the algorithm of the SVC flow manager 168. The flow manager 168 is responsible for identifying the data flow. There are two types of data flows: in one type, the order is important, e.g. user datagram protocol (UDP), and in the other type, the order is not important, e.g. transmission control protocol (TCP). To simplify the implementation of the SVC cable modem 158, the SVC flow manager 168 sends data packets for which the order is important according to the algorithm that will enable the SVC reordering manager 163 in the SVC CM 158 to easily combine packets from the two or more data streams one after one, without adding any algorithm to verify which one of them should be first. For data packets for which the order is not important, the flow manager 168 sends those packets in a way that will increase the network capacity, even if the SVC CM 158 might change the order of the packets.

A flow chart for a possible unicast scheduling method is shown in FIG. 6. The algorithm enables efficient use of the channels. The algorithm also verifies simplicity of the cable modem design 158. Table 1 defines acronyms that are used in the flow chart. The algorithm is preferably performed by the CMTS 100, for example.

TABLE 1

| Acronym | Definition | Description |
| --- | --- | --- |
| DS | Data stream | |
| SC | Supported carriers | The carriers that the cable modem supports (bit map) |
| LU | Last used | The carrier that the cable modem used in the previous time for the data stream |
| LT | Last time | The time that the last packet of the data stream was sent |
| TR | Threshold | The minimum time that should pass between the transmutation start of the consecutive message that use different channels (may be global) |

The algorithm may be performed for each data stream separately, but typically will be performed for each Ethernet MAC address. The CMTS 100 may identify that some of the data streams do not require ordering from the transport media, e.g. TCP, and the CMTS 100 will not order these packets.

The cable modem 158 receives messages from all the channels it is connected to, orders them and sends them to the central processing unit (CPU) of the CPE, for example, a PC (not shown). The cable modem 158 orders the messages according to the arriving time. Because there is a threshold that verifies that the messages of a specific stream that required ordering will not be sent with overlap on two different channels.

Referring to FIG. 6, which represents at 220 a flow chart for a cable modem 158 supporting two (or more) channels 170 and a CMTS 100 that supports ordering, the DS is identified, and the DS record is read (222). If the number of supported channels is equal to one (224), the channel assigned is the last used channel (226). If the number of supported channels is not equal to one (224), then if the last time plus threshold is larger than the send time (228), the channel assigned is the one with the shorter queue (230). However, if the last time and threshold is not larger than the send time (228), the channel assigned is the last used channel (234). The channel and other information are then saved (232).

In a shortest-queue reordering scheme, the transmitter 112 forwards the packet to the carrier 170 that has the shortest queue (among the appropriate carriers). The receiver 162 can determine the packet order according to the packet transmission start time of each packet.

An alternative scheme is an enumerated reordering scheme. In this scheme, each packet is enumerated with a serial number. The receiver can recover the original packet order according to these numbers. The advantage of this method is that packet order recovery can be done separately for different packet sequences (for example, according to the IVIAC address). This results in less latency for streams of short packets. In DOCSIS downstream channels, the enumeration can be done in the extended header of the MAC by defining such a type in this field. For example, each enumerated packet is assigned a serial number that is transmitted in the extended header. Numbering may be general, or per each MAC address, for example. This scheme requires additional overhead of 2-3 bytes per packet. A similar mechanism is required to avoid duplicates of broadcast/multicast packets. This scheme allows for improved QoS because short packets are not delayed by long packets in other carriers. Such a scheduling scheme can guarantee QoS significantly better than a prior art single-carrier approach.

Another alternative schedule scheme, for example, is a threshold method, in which packets to a given MAC address are sent in one physical channel by default. This alternative is essentially a subset of the threshold scheme described with reference to FIG. 6. The results are identical when Num(SC) is not 1 which is always the case in SVC. If the CMTS 100 decides to change the physical channel of a MAC address, there must be a minimal delay ("threshold") between the last packet sent on the old channel, and the first packet sent on the new channel. The "threshold" must be large enough to guarantee that the packets are received in the correct order (appropriate packet size).

FIG. 7 illustrates at 250 a flow chart for the threshold scheduling scheme. The DS is identified, and the DS record is read (252). "tt0" represents the last time and "tt1" represents the current time. If tt1-tt0 is less than the threshold time, then the channel is assigned to the last channel (256) and the channel information is saved (258). If tt1-tt0 is not less than the threshold time, then the length of the DS is compared. If the available length of the first channel (channel 1) is greater than the available length of the second channel (channel 2) (260), the channel is assigned to channel 2 (262) and the channel information is saved (258). If the available length of the first channel (channel 1) is not greater than the available length of the second channel (channel 2) (260), the channel is assigned to channel 2 (264) and the channel information is saved (258).

Two other scheduling schemes comprise a broadcast (i.e. packets are transmitted to all the stations) or multicast (i.e. packets are transmitted to more than one station but not all the stations) scheduling schemes. In these schemes, broadcast/multicast packets may need to be transmitted in more than one carrier, when legacy cable modems 16 are present. Multi-carrier SVC cable modems 158 need to forward only one replica of the packet, and discard the rest. An option is to enumerate the packets, e.g., assign a serial number to each broadcast/multicast packet. The SVC cable modem 158 forwards the first appearance of each packet, and discards the rest. Another option is for the cable modem 158 to receive packets with a given broadcast/multicast MAC address from one specific physical channel. The cable modem 158 then discards packets with this address in other physical channels.

Broadcast and multicast packets are transmitted over one or more of the common carriers such that they are received by all the required receiving stations (i.e., in the case of broadcast messages, all the stations; and in the case of multicast messages, all the stations subscribing to the multicast group). When there is more than one such carrier, the choice of the carrier (or carriers) is made in a similar manner to the unicast case.

When there is no single carrier that is common to all the relevant stations, the packet is transmitted in multiple copies over a few carriers, such that all the addressees receive at least one copy of the packet. However, some stations may receive more than one copy of the packet, and the additional copies should then be discarded, which can be accomplished by enumerating the packets. Multiple copies of the same packet should have the same serial number, for example. When the receiving station receives more than one packet with the same serial number, it forwards only one copy. The enumeration can be done over all the packets of the channel or separately for each MAC address.

In a broadcast scheduling scheme, the CMTS 100 is adapted to realize the channels that the cable modems 158 are waiting for broadcast. The CMTS 100 is adapted to duplicate the broadcast message, and send it to each one of these channels. The cable modem 158 is adapted to define on which channels it is required to receive broadcasts from. The cable modem 158 is also adapted to transfer all the broadcast messages for these channels, and discard all the broadcast packets that are arriving from the other channels.

In a multicast scheduling scheme, the CMTS 100 may use one of the channels for multicast messages, because the required capacity for multicast and the number of modems 158 that will use the multicast scheme may be low. Each cable modem 158 that needs to receive multicast messages in a specific period of time should be able to obtain this information. However, when the multicast capacity grows, the CMTS 100 will send most of the multicast messages for most of the multicast MAC addresses to one of the channels, but some of the multicast MAC addresses will be transferred to a different channel. The CMTS 100 is responsible for updating the cable modems 158 with the channels that are used for each of the multicast MAC addresses. The CMTS is also adapted to duplicate multicast messages, and send them on some channels when there are cable modems 158 that cannot receive these messages from one channel. For example, the CMTS 100 may transfer cable modems 158 from one channel to another to reduce the message duplication. From the cable modem 158 standpoint, there is a channel that is described as the default multicast channel. In addition, for each multicast MAC address, the CMTS 100 may define for each cable modem 158 on which channels it is responsible for receiving this message. For each multicast MAC address, the cable modem 158 is responsible for receiving all the packets only from one channel.

The SVC architecture having an SVC CMTS 100 and an SVC cable modem 158 preferably is adapted to support 1024 QAM downstream, which increases the spectral efficiency by 25% and allows 100 Mbps in 12 MHz bandwidth. However, using 1024 QAM presents some challenges. 1024 QAM may present a phase-noise problem, which is solvable, and two solutions are provided here. It is advantageous (though not mandatory) that the carriers of the SVC would be in adjacent channels and occupy the same spectral band as if the Baud were increased. When the carriers are in adjacent channels, it is easier to transmit them with a single up-converter and receive them with a single tuner. This reduces the cost and improves the phase noise performance.

An advantage of the increased Baud approach is that for a given phase noise environment, a better performance may be achieved than with a single narrowband signal. The reason is that when a high symbol rate is used, the phase tracking loop has wider bandwidth, and therefore can compensate for a larger portion of the phase noise. This is demonstrated in FIG. 8. A phase tracking loop bandwidth of a single carrier/low baud rate signal is shown at 270, and a phase tracking loop bandwidth of a single carrier/high baud sync multi-carrier/low baud signal at 272. The carrier phase noise is shown at 274. In low symbol rates, the bandwidth of the tracking loops is narrower. Therefore, a larger portion of phase noise is not tracked. This implies stricter phase noise restrictions on the tuner within the PHY receiver 162, especially when high constellations (1024 QAM) are used.

However, when multiple carriers are jointly up-converted and down-converted by the same local oscillators (LO), they all practically have the same phase noise, because these are the most significant contributors to the phase noise. Therefore, the receiver can jointly track the carrier phase of all carriers by a tracking loop.

A circuit 300 for solving the phase-noise problem when implementing the SVC, comprising a wide band loop is shown in FIG. 9. Note that some elements of the modem such as equalizers, gain loop, timing tracking circuitry and others were omitted from the figure, as they are implemented as in a conventional modem and are not relevant to the invention. The figures describes only the part of the modem that is affected by the phase noise reducing circuitry. Channel 1 is coupled to a mixer 316 that is adapted to down-convert the channel 1 signal from passband to baseband. The mixer 316 is coupled to the input of slicer 302. The slicer 302 comprises a demapper from which the processing is as in a conventional modem. The slicer 302 input and output are coupled to a phase detector (PD) 306. PD 306 is coupled to switch S1. Channel 2 is coupled to mixer 318, slicer 304, PD 308, and switch S1 similarly. Switch S1 is coupled to a loop filter 310, and loop filter 310 is coupled to a Numerically Controlled Oscillator (NCO) 312. NCO 312 is coupled to an $e^{jx}$ function 314. The $e^{jx}$ function 314 is coupled to multipliers 316 and 318.

The wide-band loop shown in FIG. 9 may be implemented if the symbols have T/2 offset, where T is the symbol period. The carriers channel 1 and channel 2 are jointly up-converted in the CMTS and down-converted in the CM with the same local oscillators (not shown). Carriers channel 1 and channel 2 use the same symbol clock reference. There is an offset of TS/2 between the symbol clock transitions of the carriers.

In the transmitter 112 the carriers 170 are divided into one or more groups. Each group should comprise at least two carriers 170. All the carriers 170 within a group of N carriers preferably have the following characteristics: identical symbol rate ($R_s$), synchronized symbol clocks (i.e. their symbol clocks are locked to the same reference), there is an offset of $T_s/N$ between the symbol phases of the carriers, where Ts=1/R and all the carriers of the group are jointly up-converted.

In the receiver, there is a joint phase tracking for the carriers of each group. Each carrier produces a phase error input to the loop at a symbol rate ($R_S$). Since the symbol phases of the carriers are evenly distributed, there will be a phase error input to the joint phase tracking loop at a rate of $NR_S$. This is the same rate of the increasing the Baud rate option (single carrier) that occupies the same bandwidth as the group of carriers. Therefore, the loop can achieve the same performance as increasing the Baud rate.

An alternative circuit 400 for solving the phase-noise problem when implementing the SVC, comprising a down-converter Local Oscillator (LO) is shown in FIG. 9. Channel 1 is coupled to a mixer 416 that is adapted to down-convert the channel 1 signal from passband to baseband. The mixer 416 is coupled to the input of slicer 402. The slicer 402 input and output are coupled to a phase detector (PD) 406. PD 406 is coupled to adder 418. Adder 418 is coupled to a loop filter 410, and loop filter 410 is coupled to a NCO 412. NCO 412 is coupled to an $e^{jx}$ function 414 which is coupled to mixer 416. An optional processor 420 comprising a DSP, for example, is coupled to adder 418. A down converter LO is the device used in the modem 158 to convert the signal from RF to IF. This LO is comprised of a frequency reference signal 430, PD 428, a loop filter 422 a Voltage Controlled Oscillator (VCO) 424 and a frequency divider 426. The frequency reference signal 430 is coupled to PD 428 that is coupled to processor 420. PD 428 is also coupled to loop filter 422. Loop filter 422 is coupled to Voltage Controlled Oscillator (VCO) 424. The output of VCO 424 is coupled to a frequency divide by N function 426 which is coupled to PD 428.

Because a major contributor to the phase noise is the receiver 162 down-converter, samples of the LO of the receiver 162 down-converter can be used to compensate the phase noise. This circuit and method is applicable also for 6 MHz signals.

The CMTS 100, cable modem 158 and method for scalable data communications channels described herein is applicable for packet networks with multi-user Channels, particularly, point to multi-point channels (such as the cable television (CATV) downstream channel and Local Multi-point Distribution System (LMDS) downstream channel), multi-point to point channels (such as the CATV upstream channel and LMDS upstream channel) and multi-point to multi-point channels (such as home phone--wire networks (HomePNA)). Although the method is applicable to all these channel types, it is particularly beneficial CATV downstream applications.

The CMTS 100, cable modem 158 and method having a SVC 164 are scalable and allow for gradual expansion of the network bandwidth with incremental investment in equipment, efficient utilization of the spectral resources and backward compatibility with the stations installed prior to the bandwidth expansion ("legacy" stations). The method allows for high utilization of the improved statistical characteristics of a wideband channel and can guarantee good QoS. Additionally, it allows for low power consumption when power resources are scarce.

These advantages are achieved by the following: when new bandwidth is available for a channel, it is used for transmission of carrier (or carriers) in addition to the carrier (or carriers) that existed in the channel before the bandwidth expansion. In all the stations that support the wider bandwidth, all the carriers are managed by a single MAC 163, thus comprising a single virtual wideband channel. A transmission between a pair of stationsis performed in one or more of the carriers 158 supported by both stations.

The present invention has the benefits of the increased Baud rate approach and also of increasing the number of carriers. The invention comprises multiple carriers, and at least one of them may have a PHY layer that is identical to the legacy stations. The expanded network MAC 114 supports the legacy network MAC 16. However, a station that supports the expanded bandwidth has a MAC sub-layer that controls all the carriers 158 within the station's bandwidth. The method provides most of the benefits as increasing the Baud rate, while being backward compatible with legacy stations 16. The scalable multi-carrier approach disclosed herein achieves the performance of a wideband single-carrier, thus, it is called a scalable virtual channel (SVC).

The channel consists of multiple carriers within the allocated bandwidth. The carriers do not have to have identical PHY layer (i.e. symbol rate, modulation scheme, forward error correction, etc.) Each station in the network can transmit and/or receive over one or more of the carriers. Legacy stations use a portion of the available carriers. There may be different generations of legacy stations. Each generation use a different number of carriers and/or carriers with different characteristics (symbol rate, modulation, etc.). The stations of the "youngest" generation typically use all the carriers and are backward compatible with the legacy stations (i.e. they can receive from and/or transmit to the legacy stations).

The SVC approach described herein allows for an efficient low-power mode that can be activated when energy resources are scarce, for example, in battery-powered stations or during electricity breakdown when a backup battery is operated. In this case it is desirable to reduce the symbol rate of the station's transmitter and/or receiver in order to decrease the power consumption of the station. In the prior art (single carrier), reducing the symbol rate of the carrier brings about reduction of the overall network throughput, including stations that do not need reduced-power operation. However, when the present SVC approach is used, a low-power mode can be achieved using a single carrier by the station. In this case, there is no reduction in the spectral efficiency of the transmissions that are related to the low-power station because it would occupy less bandwidth that would be available to other stations (either in low-power mode or not). For example, in CATV downstream channel, when a receiving station is in low-power mode, it uses a single carrier. The rest of the carriers can be used by the central office for transmission to other station (either in low-power mode or not), assuming that the central office is not in low-power, which is usually the case.

The Scalable Virtual Channel (SVC) may be added as an enhancement to the DOCSIS protocol that enables increasing the downstream capacity. The SVC feature is backward compatible to the existing DOCSIS standard.

Although the invention is described herein for use with signals via fiber-optic and coaxial cables in a cable TV environment, it is anticipated that the present invention is effective in other data transmission devices and systems such as telephony, wireless, fiberoptic and satellite applications, for example. The present invention is applicable in any communications network that has more than one channel from one point to another point, or from a central point to multi-point; such as, connecting two routers through two Ethernet ports.

Figure 11:
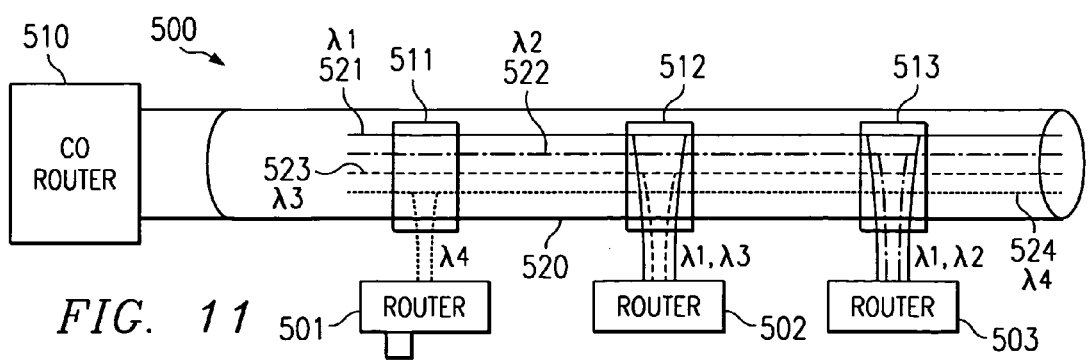
FIG. 11 shows an application of the SVC invention in a fiber-optic Dense Wavelength Division Multiplexing (DWDM) system.

For some technologies, the best solution for increasing the channel bandwidth is by adding a virtual channel as described herein, because it is very difficult to implement a higher rate PHY layer, e.g., DWDM, satellite, or it is cost-prohibitive. For example in a satellite, the satellite transponder must be modified. Referring to FIG. 11, shown at 500 is the present SVC invention in use in a fiber-optic DWDM network. Central office (CO) router 510 is adapted to send information over fiberoptic 520 using a plurality of wavelengths 521, 522, 523, 524. Routers 501, 502, 503 are coupled to the fiber 520 using add/drop units 511, 512, 513. In the Figure, there are two types of routers. One of them can receive only one wavelength (e.g. router 501 is adapted to receive wavelength 524), and the other type of router can receive more than one wavelength (e.g. router 502 is adapted to receive wavelengths 521 and 523, and router 503 is adapted to receive wavelengths 521 and 522). Using the SVC technique and algorithm disclosed herein, the central office router 510 may have one virtual channel when each one of the routers 501, 502, 503 specifies to receive some specific wavelengths. This may be used, for example, for more efficient multi-casting using wavelength 521 because wavelength 521 is received by both router 501 and router 502.

While the SVC invention disclosed herein for use in the downstream communications, it is also beneficial for upstream communications.

While the invention has been described with reference to illustrative embodiments, this description is not intended to be construed in a limiting sense. Various modifications in combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of scalable multi-carrier data communication, said method comprising:
   receiving a first data stream, comprising a plurality of packets, in a first device;
   determining a plurality of channels, wherein each channel consisting of a multiple carriers within an allocated bandwidth and each carrier capable of being a physical and logical channel;
   forming a single scalable virtual channel (SVC) having consisting of at least a first carrier and at least a second carrier, said SVC for transmission of packets to a second device;
   dividing the plurality of packets of the first data stream among two or more of the plurality of physical-channels for transmission to the second device.

2. A method according to claim 1, wherein a software management function determines the plurality of channels at the first device and informs the second device which of the plurality of channels form said single scalable virtual channel (SVC) and to use for receiving the packets.

3. A method according to claim 2, further comprising:
   at the second device, receiving the plurality of packets on single scalable virtual channel (SVC);
   merging the plurality of received packets into a second stream of data; and
   reordering packets in the second stream of data according to a transmit time of each packet.

4. A method according to claim 1, further comprising:
   configuring a data flow manager function at the first device with information of the plurality of channels used to form said single scalable virtual channel (SVC).

5. A method according to claim 1, wherein the plurality of channels correspond to a plurality of transmitters at the first device and a plurality of receivers at the second device.

6. A method according to claim 5, wherein each transmitter and receiver is associated with a media access controller function in the corresponding device.

7. A method according to claim 6, wherein a first scaleable virtual channel media access controller includes all media access controllers and transmitters in the first device.

8. A method according to claim 6, wherein a second scaleable virtual channel media access controller includes all media access controllers and receivers in the second device.

9. A method according to claim 1, wherein packets are modulated over a plurality of carriers corresponding to the plurality of physical channels.

10. A method according to claim 1, wherein each one of the plurality of channels has a plurality of physical parameters that are different from other physical channels.

11. A method according to claim 1, further comprising:
    routing packets to the plurality of physical channels based on channel load of each physical channel.

12. A method according to claim 1, further comprising:
    scheduling packets based on a threshold.

13. A method according to claim 1, wherein packets are transmitted according to one or more of a unicast scheduling scheme, a multicast scheduling scheme, and a broadcast scheduling scheme.

* * * * *